(12) United States Patent
Schwaller et al.

(10) Patent No.: US 6,508,914 B1
(45) Date of Patent: Jan. 21, 2003

(54) DEVICE FOR APPLYING A PRESSURE-SENSITIVE LABEL ON A DISK-SHAPED ARTICLE

(75) Inventors: Edwin Schwaller, Kuttigen (CH); Andre Schwaller, Schonenwerd (CH)

(73) Assignee: Dynosys AG, Staad (CH)

( * ) Notice: Subject to any disclaimer, the term of this patent is extended or adjusted under 35 U.S.C. 154(b) by 0 days.

(21) Appl. No.: 09/331,454

(22) PCT Filed: Dec. 30, 1997

(86) PCT No.: PCT/CH97/00485
§ 371 (c)(1),
(2), (4) Date: Aug. 12, 1999

(87) PCT Pub. No.: WO98/29313
PCT Pub. Date: Jul. 9, 1998

(30) Foreign Application Priority Data

Dec. 31, 1996 (CH) .............................................. 3205/96

(51) Int. Cl.⁷ ............................. B65C 11/00; B65C 1/02
(52) U.S. Cl. ...................... 156/391; 156/556; 156/580; 156/538
(58) Field of Search ................................. 156/391, 556, 156/538, 579, 580; 40/638, 340; 428/40.1, 41.7, 41.8, 42.1, 42.2, 42.3

(56) References Cited

U.S. PATENT DOCUMENTS

| | | | | |
|---|---|---|---|---|
| 2,037,343 A | * | 4/1936 | Scholl | .......................... 206/79 |
| 4,385,460 A | | 5/1983 | Hanna | |
| 4,903,255 A | | 2/1990 | Sugaya et al. | |
| 5,084,127 A | | 1/1992 | Nakamura | |
| 5,238,107 A | * | 8/1993 | Kownacki | .................. 206/310 |
| 5,242,381 A | * | 9/1993 | Hoffmann et al. | ............ 602/57 |
| 5,316,464 A | | 5/1994 | Lexell | |
| 5,320,219 A | * | 6/1994 | Ward | .......................... 206/224 |
| 5,543,001 A | | 8/1996 | Casillo et al. | |
| 5,715,934 A | * | 2/1998 | Tobol et al. | ................. 206/232 |
| 5,951,819 A | * | 9/1999 | Hummell et al. | ........... 156/556 |

FOREIGN PATENT DOCUMENTS

| | | | | |
|---|---|---|---|---|
| DE | 296 10 120 U1 | | 1/1997 | |
| DE | 296 17 424 U1 | | 1/1997 | |
| DE | 29701708 U1 | * | 3/1997 | |
| DE | 29817456 U1 | * | 12/1998 | ............. B65C/1/02 |
| EP | 0 418 608 A1 | | 3/1991 | |
| EP | 0855713 A1 | * | 1/1998 | |
| FR | 2 634 931 A1 | | 2/1990 | |
| GB | 2 179 910 A | | 3/1987 | |
| JP | 2001010623 A | * | 1/2001 | ........... B65C/11/00 |
| WO | WO 96/05057 | | 2/1996 | |

* cited by examiner

Primary Examiner—Richard Crispino
Assistant Examiner—Sue A. Purvis
(74) Attorney, Agent, or Firm—Greenblum & Bernstein, P.L.C.

(57) ABSTRACT

An apparatus (1) for the accurate centrical placement of a self-adhesive label (12e) onto a disk-shaped object (11), particularly a compact disk (11a), comprising a first housing part (2) provided with a locating device (4) for the label (12e), as well as a second housing part (3) provided with a locating device (3b) for the disk-shaped object (11), whereby the housing parts (2, 3) are connected with each other to swivel about a common swivel axis (C) and are conveyable from an open position into a closed position such that, in this closed position, the locating devices (3b, 4) are placed in a position arranged to face one another and that, in this closed position, at least one of the two locating devices (3b, 4) is movably arranged in the respective housing part to move in the direction toward the opposite locating device, in order to bring the disk-shaped object (11) into contact with the label (12e). The labels (12e) are adaptedly structured according to the apparatus (1).

36 Claims, 9 Drawing Sheets

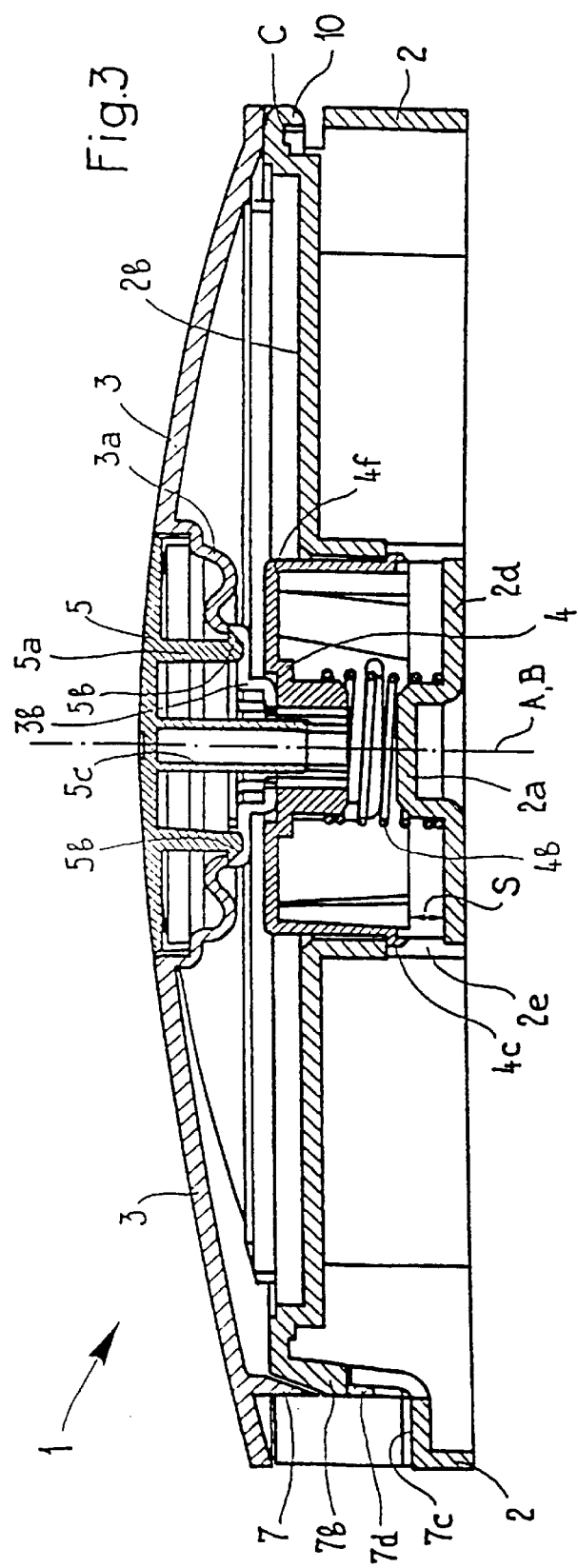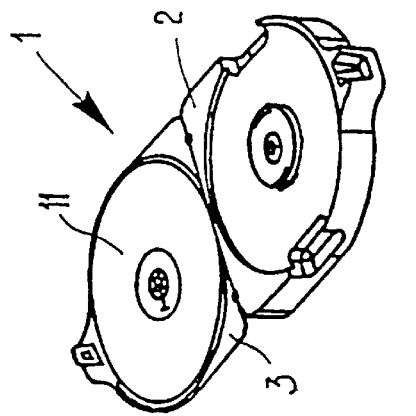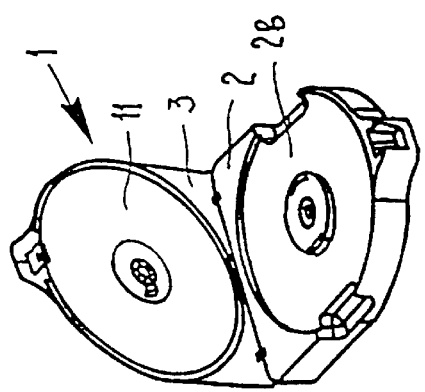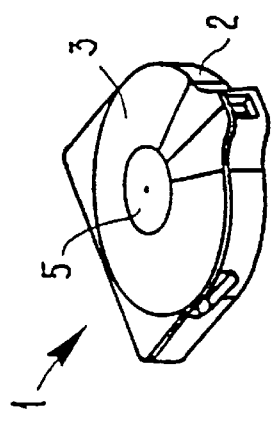

DEVICE FOR APPLYING A PRESSURE-SENSITIVE LABEL ON A DISK-SHAPED ARTICLE

The invention relates to an apparatus for the application or placement of a self-adhesive label onto a disk-shaped object, particularly a compact disk, in accordance with the introductory clause of claim 1. The invention further relates to a label adaptedly structured commensurate with the apparatus, in accordance with the introductory clause of claim 10. Furthermore, the invention relates to a method of operating the apparatus according to the invention.

From the published PCT-International Application No. WO 96/05057 there is known an apparatus for best possible centric placement of a self-adhesive label onto a compact disk. A centered adhesive application of a label upon a compact disk, also known as a CD, is extremely important for technical reasons. A CD rotates during the reading process at a very high reading rate. If the CD is unbalanced, the thereby caused eccentrically acting forces are imparted to the reading device, particularly to the mechanical parts and the reading head, which results in premature wear or even damage or breakage of the reader. Therefore, the adhesive label must be applied or affixed onto the compact disk in an exact as ever possible centric position. The known apparatus of the aforementioned-prior art has the disadvantage in that it consists of several single components which have to be manually assembled and guided in a determinate consecutive renders difficult an exact centering of the label with respect to the CD and, on the other hand, this reveals problems while holding the individual components, because the sticky surface of the positioned adhesive label renders practically impossible the detachment of fingers without shifting the label off-center. A further disadvantage is seen in the fact that, subsequent to detaching the carrier foil and during the placement on the device, the label arches, bends up in dead center and is thus not arranged to be layed totally flat. Furthermore, it is conceivable that the manually guided CD is placed in a position slightly canted relative to the label, so that, for instance, air bubbles locked between the CD and the label can build up, or the label is affixed eccentrically relative to the CD. Furthermore, there is a clearance or play:

between the positioning hole and the inner circle of the adhesive label;

between the positioning hole and the cylindric guide; and between the inner circle of the compact disk and the diameter of the cylindrical extension.

It is an object of the present invention to provide a new and improved apparatus for applying a self-adhesive label onto a disk-shaped object, particularly a compact disk, which apparatus renders possible a simple, centered and reliably reproducible placement of the adhesive label.

This object of the invention is implemented by means of an apparatus characterized by the features according to claim 1. The sub-claims 2 to 9 refer to further advantageous embodiments of the apparatus according to the invention.

A further object of the present invention is to provide a new and improved adhesive label for a compact disk, which label is adapted to the apparatus according to the invention and renders possible a simple and dependable application thereof onto the compact disk.

This object is implemented by means of an inscribable or printable compound label comprising the This further object of the invention is implemented by means of an inscribable or printable compound label comprising the characteristics defined in claim 10. The sub-claims 11 through 17 refer to further advantageous embodiments of the inscribable compound label, which are particularly structured as a sheet containing self-adhesive labels. Furthermore, the object of the invention is solved by a method of applying self-adhesive labels, said method having the characteristics defined in claim 18.

The apparatus according to the invention for especially centric placement of a self-adhesive label onto a disk-shaped object, particularly a compact disk, comprises a first housing part with a locating device for the adhesive label as well as a second housing part with a locating device for the disk-shaped object, whereby the housing parts are movably connected with each other, particularly in swivelling or translational manner, and conveyable from an open position into a closed position in such a manner that, in the closed position, the locating devices are placed in a position arranged to face one another, and that in said closed position at least one of the locating devices is movably arranged in the respective housing part to travel in the direction toward the respective opposite locating device, in order to bring the disk-shaped-object into contact with the adhesive label.

An advantage of the apparatus according to the invention is seen in that, in the open position, the compact disk is readily and conveniently insertable in a position determined by the second housing part, and in that the self-adhesive label together with the carrier foil and/or grip tabs thereof is readily and conveniently insertable and positionable in a position determined by the first housing part. Subsequent to the insertion into the first housing part, the carrier foil of the adhesive label is detached or peeled off, whereby the label is securely located by said first housing part, so that there is hardly any hazard or risk that the fingers of the operator can come into contact with the bare sticky surface of the adhesive label. By way of example, the two-housing parts are connected with each other to swivel about a common swivel axis, so that in a simple manner the housing parts can be foldingly brought into a closed position, after which the compact disk and the adhesive label are arranged and aligned opposite one another. In this position there is exerted, particularly upon the center of the second housing part or rather upon a control button arranged thereat, a light force directed toward the first housing part, so that the two housing parts or rather the two locating devices draw closer to one another and the compact disk thereby comes to lie on the adhesive label, the latter thus being affixed.

In a further advantageous embodiment of the apparatus according to the invention, the adhesive label and the compact disk in the closed position are arranged to be accurately mutually centered. During the closing travel into the closed position, the mutual centering takes place automatically, so that the adhesive label and the compact disk in their closed position are arranged to be superimposedly centered and now only have to be moved for mutual contact by means of a slight pressing movement. Self-adhesive labels can be thus exactly centrically affixed to compact disks or other disk-shaped objects.

The mutual or interdependent centering of the two housing parts or rather of the two locating devices has the further advantage in that the apparatus according to the invention renders possible exact centering of the adhesive label relative to the compact disk even then, when the component parts, for instance, on the basis of process or work tolerances, are shaped slightly differently. Mutual centering thus also exercises a tolerance-compensation function. An advantage is obvious in that the component parts with low tolerance requirements can be cost-effectively fabricated. By virtue of the relatively low tolerance requirements, the apparatus according to the invention consisting of several component parts is also relatively simple and economical to assemble.

The two housing parts can be brought by means of translational motion and/or rotatory motion into a position for mutually centering the label and the disk-shaped object. In a preferred exemplary embodiment the two housing parts are mounted to be set in motion about a common swivel axis.

In an advantageous embodiment the first housing part comprises a flat supporting surface for a label or rather for a compound label, so that the latter in a first step is layed upon the flat supporting surface and thereafter the carrier foil and/or the grip tabs are peeled off, so that the self-adhesive surface of the label comes to lie on top without causing, during the peel-off of the carrier foil and/or of the grip tabs, finger marks and the like on the self-adhesive surface. Since the fingers of the operator do not become sticky, there is ensured that, upon removal of the CD from the second housing part, no sticky finger prints will be transferred onto the CD-surface readable by the laser. Later on such finger prints would impair reliable reading of the stored data or information. In a further advantageous embodiment the first housing part comprises a spigot with spring elements allotedly arranged at the circumference, which elements retain the label along the inner circle, such that an arching of the label is precluded and, moreover, dimensional tolerances of the inner circle of the labels or of the spigot are correctively compensated. In yet a further advantageous embodiment of the apparatus, the spigot is floatingly retained or mounted in the first housing part and is centered during the folding of the two housing parts by a guiding element arranged at the second housing part, so that the label is accurately centered and arranged opposite the compact disk irrespective of possible differing dimensional tolerances of the two housing parts as well as of the spigot.

The inventive adhesive label for the identification of a compact disk is structured as a compound label having a planiform flexible carrier material as well as at least one detachable CD-label adhesively affixed thereat and comprising a particularly circular recess, whereby the carrier material comprises rated cuts or predetermined break lines which, in the circumferential direction of the label, protuberantly extend at least sectionally beyond a peripheral border or edge of the adhesive label.

The adhesive label can be structured to be inscribable and, for example, can consist of paper. The label is printable or rather inscribable particularly by means of an ink-jet printer or by means of a laser printer. The surface of a compact disk can be also directly printed, for example, by means of an ink-jet printer, whereby the used color is normally water-soluble. Under the term 'label' of the compound label of the present invention, there is also to be understood a transparent lamination sheet for covering the compact-disk surface, whereby this transparent lamination particularly serves the purpose of protecting the water-soluble color deposited on the compact disk. Such a transparent-lamination label can be designed to be very thin or to have a high finish or gloss. Particularly for such a label it is of paramount importance that, in the course of placing the adhesive label onto the compact disk, no contact with fingers of the operator takes place. By virtue of the construction of the inventive compound label, such contact with the fingers of the operator is quite impossible.

An advantage of the compound label in accordance with the invention is seen in that the carrier material protruding partially beyond the peripheral edge or border of the label renders possible a simple insertion of the compound label into the apparatus according to the invention, and in that subsequent to insertion the carrier material can be simply grasped and peeled off from the label, so that the label is held by the apparatus according to the invention in a defined position and that during peel-off no contact between the sticky surface of the label and the operator's fingers takes place.

The invention will be better understood when consideration is given to the following detailed description thereof. Such description makes reference to the annexed drawings, wherein:

FIG. 3 shows a longitudinal section through the apparatus depicted in the closed position or rather in the locked position thereof;

FIG. 4a shows a perspective view of the apparatus in the closed position;

FIG. 4b shows a perspective view of the apparatus in a half-open position;

FIG. 4c shows a perspective view of the apparatus in the open position;

Figure 1:
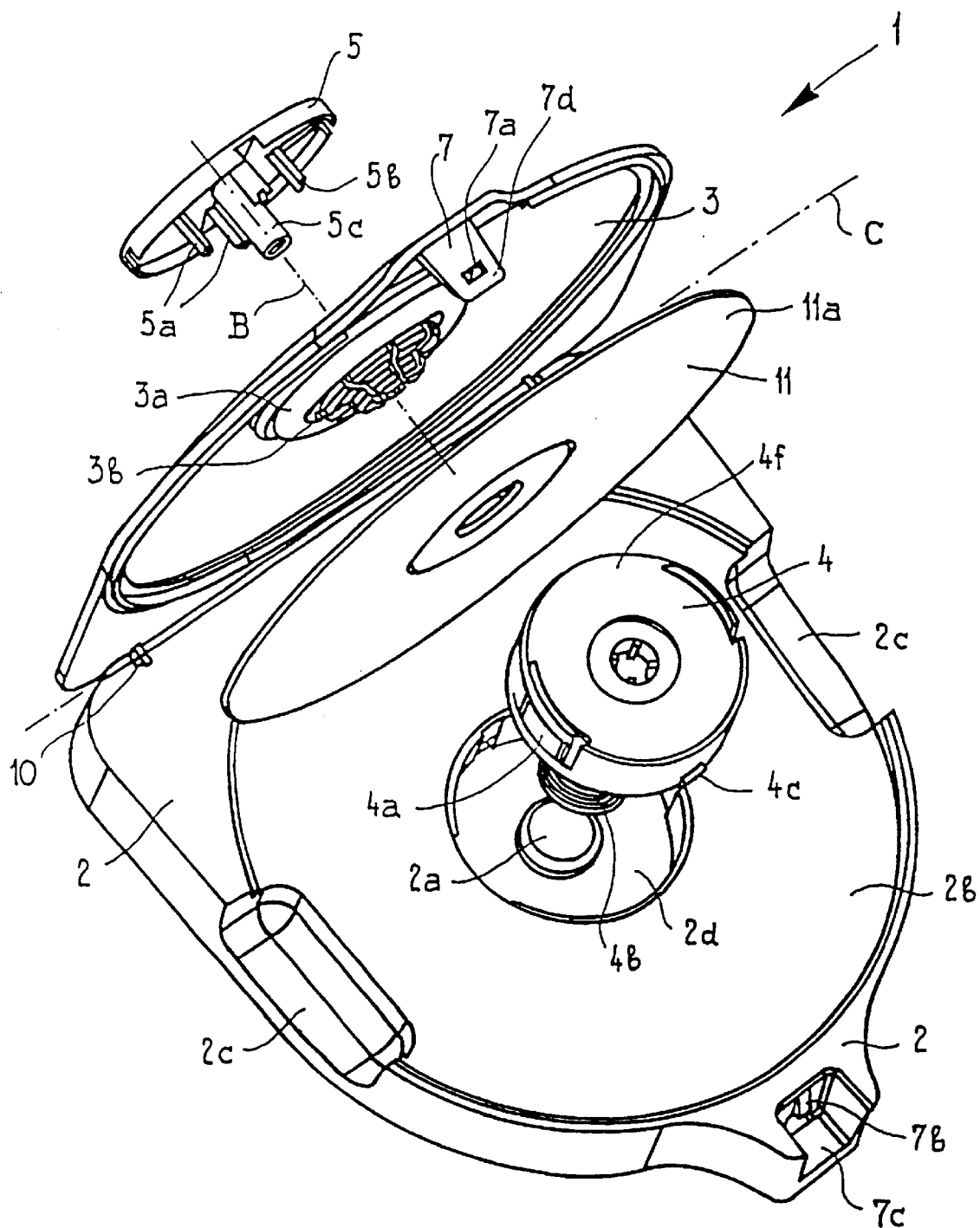
FIG. 1 shows an exploded view of an apparatus for the placement of a self-adhesive label on a CD.

FIG. 1 shows in an exploded view individual component parts of an apparatus 1 for the accurate centric placement or application of a self-adhesive label 12e onto a disk-shaped object 11 structured as a compact disk 11a. A first housing part 2 is structured as a housing bottom and comprises a flat circular supporting surface 2b for the self-adhesive label 12e as depicted in FIG. 2b. In the center of this supporting surface 2b there is provided a recess 2d for receiving a locating device 4. The first housing part 2 comprises two oppositely arranged recesses 2c which, on the one hand, serve as holders for the fingers of an operator in order to conveniently manipulate the apparatus 1 and, on the other hand, to make the adhesive label 12e readily accessible. The locating device 4 for the label 12e is structured in the depicted embodiment as a spigot 4f which, at the circumference thereof, comprises at least two, preferably three or even more, spring elements 4a which, as shown in FIG. 2b, are in interaction with the inside or inner circle of the self-adhesive label 12e or rather of the compound label 12.

The spigot 4f is by virtue of detent noses 4c retained to be vertically slidable in guide apertures 4e of the first housing part 2, whereby the spigot 4f is detained upwardly prestressed by means of a spiral spring 4b, which is held centered relative to the recess 2d by means of a nose 2a (FIG. 3). The diameter of such recess 2d is structured slightly larger than the outer diameter of the spigot 4f, so that the latter is floatingly located in the recess 2d of the first housing part 2, such float mounting being relative to the direction extending axially with respect to the spigot 4f as well as relative to a direction extending radially with respect to the spigot 4f. The spring elements 4a are close-lying at the wall of the recess 2d. When the label 12e is placed and thereby slips over the spring elements 4a, the latter are slightly stressed to the inside by the inner circle 12k of the label 12e.

A second housing part 3 is firmly connected to the first housing part 2 by means of hinges 10 forming a common swivel axis C. This second housing part 3 comprises a locating device 3b for the purpose of keeping the compact disk 11a in a position or place which extends concentrically and perpendicularly to a first axis A which is the axis of of the first housing part 2. The locating device 3b is structured as a snap-connection device consisting of eight individual spring legs or struts and generally known in the art for compact disks. Moreover, this locating device 3b is connected with the other or remaining part of the second housing part or cover 3 by means of a resilient membrane arrangement 3a. Furthermore, there is illustrated an actuating device 5 including spring flexible tongues 5a, hold-down noses 5b and a cylinder-shaped centering plug 5c. Both housing parts 2 and 3 have interlocking parts 7a and 7b provided on the side remote from the swivel axis C. Part 7b is a locking nose into which the recess 7a engages in the locked position of the apparatus. Such locked position is effected in that, when both housing parts 2 and 3 are superposedly arranged in the closed position, a locking component 7d is manually lightly pressed toward the bottom of the first housing part 2, thereby locking said locking nose 7b with the recess 7a. A further recess 7c is provided in the first housing part 2, so that the locking component 7d can be pulled to the outside by using a finger, thereby unlatching the locked position.

Figure 2A:
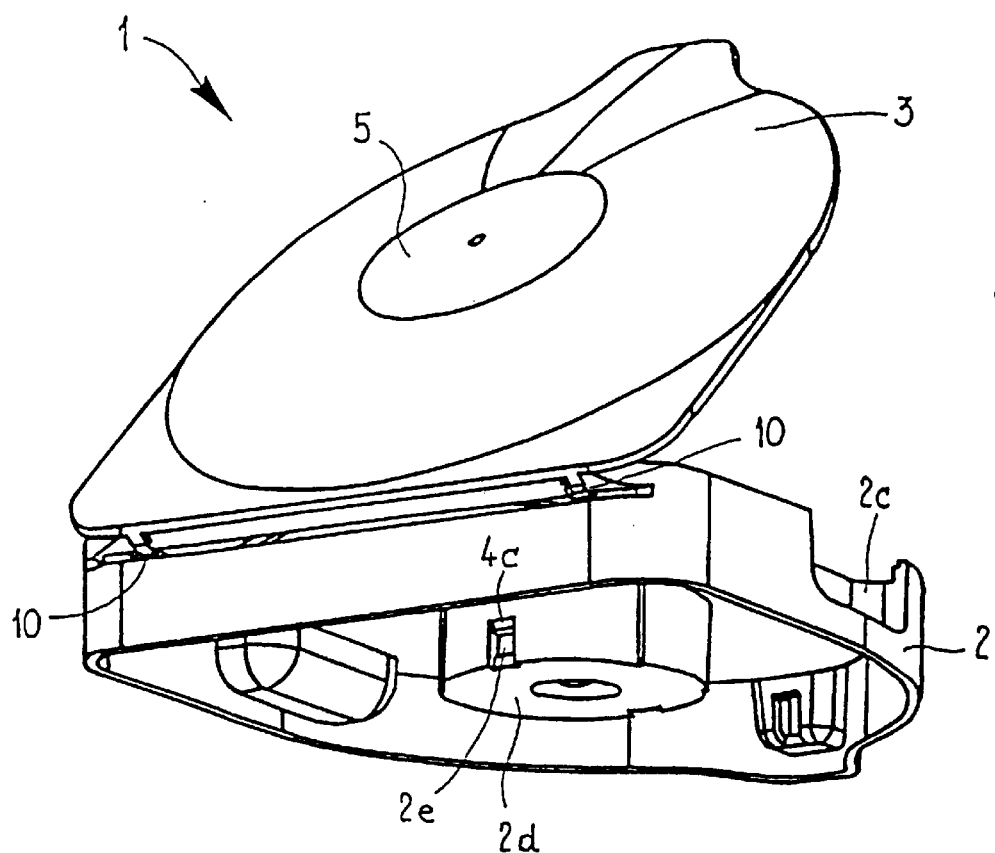
FIG. 2a shows a bottom perspective semi-plan view of the apparatus illustrated in FIG. 1.
Figure 2B:
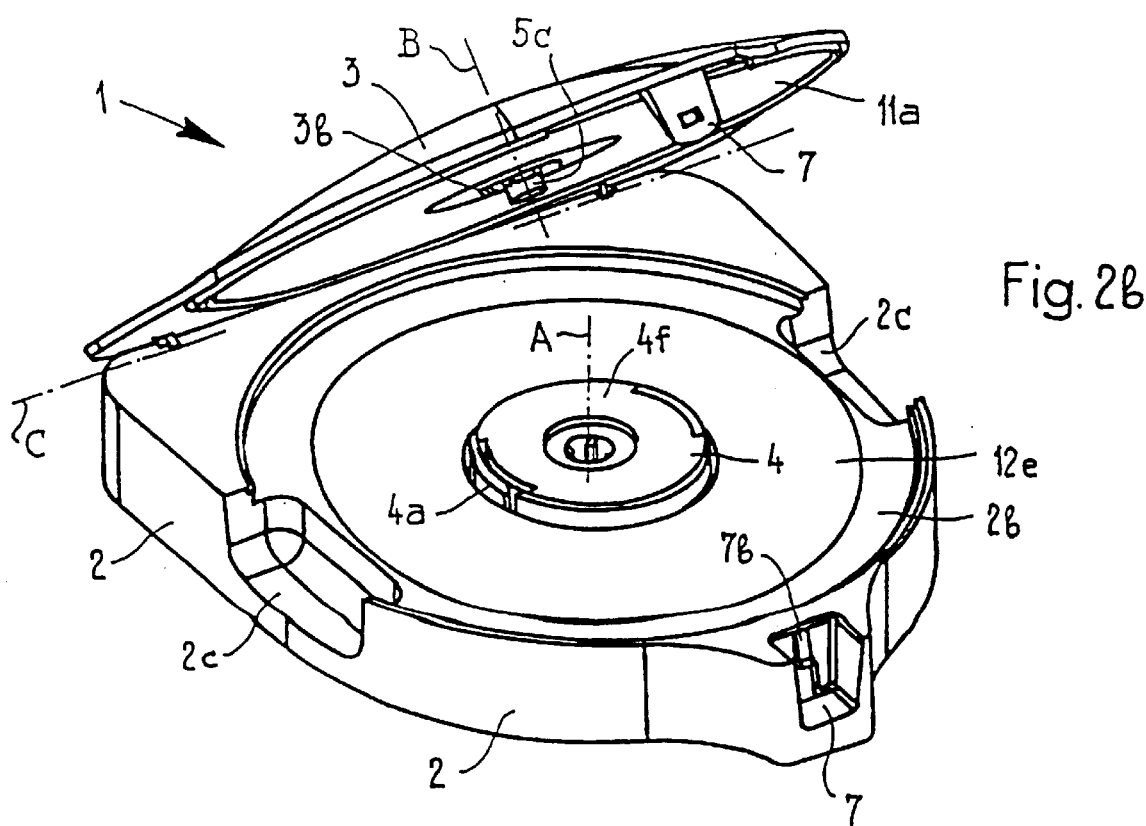
FIG. 2b shows a top perspective semi-plan view of the apparatus illustrated in FIG. 1.

In the perspective bottom semi-plan view of FIG. 2a, there is shown the engagement of one of the detent noses 4c into the guide aperture 2e of the recess 2d, whereby such guide aperture 2e tolerates a limited movement of the locating device 4 in the extensional direction of the guide aperture 2e. The actuating device 5 is structured as a push-button which is shaped and arranged to extend along the contour of the second housing part 3.

FIG. 2b shows a perspective top semi-plan view of the apparatus 1 according to the invention. The label 12e is placed, glued side up, upon the supporting surface 2b of the first housing part 2. The locating device 4 structured as the spigot 4f tenters the inner or inside circle of the adhesive label 12e by means of the spring elements 4a and thereby picks up the dimensional tolerances of the inner or inside circle. Such label 12e is held by the spigot 4f to extend concentrically and perpendicularly with respect to the axis A of the first housing part 2. Such spigot 4f is positioned to be slightly movable in the radial direction relative to the axis A. In the second housing part 3, the compact disk 11a is held by the locating device 3b in a position extending concentrically and perpendicularly relative to a second axis B which is the axis of the second housing part 3. During sluing travel of the second housing part 3, actually the housing cover, about the swivel axis C, the two locating devices 3b and 4 are brought nearer and nearer together, such that these locating devices 3b and 4 are arranged—with said housing cover closed—in a position facing one another. This position can be also designated as the closed position.

When the second housing part 3 is almost closed, the cylinder-shaped centering plug 5c moves into engagement with a centering recess 4g of the spigot 4f (FIG. 6b), whereby the latter if need be is slightly displaced radially with respect to the first axis A, so that the first axis A and the second axis B extend congruently, such that the compact disk 11a and the adhesive label 12e extend exactly concentrically and superimposedly aligned.

FIG. 3 illustrates an axial section of the apparatus 1 in the locked position thereof. Locking means 7 are closed in this position. However, the closed position of the apparatus 1 will be also discussed in conjunction with FIG. 3. Such closed position differs from the locked position in that the locking means 7 are open. These locking means 7 are structured such that, in the case of the normal closed position, the locking means do not automatically lock. On the contrary, they remain open such that—subsequent to reaching the closed position without actuation of the locking means—the apparatus 1 can be brought back to the open position. However, the apparatus 1 transferred to the closed position can be brought into the locked position by manually actuating the locking means 7 in such a manner, that these locking means lock the apparatus 1 as depicted in FIG. 3. To simplify the showing of the latter, the compact disk 11a as well as the label 12e are not included in the apparatus illustrated in FIG. 3. The locating device 4 structured as the spigot 4f has a determinate maximum stroke s which is determined by the guide aperture 2e. The resilient membrane arrangement 3a in the mid-portion of the second housing part or cover 3 is connected in the inner area to the locating device 3b and in the outer area to the cover of the arched second housing part 3. The actuating device 5 structured as a press-button is movable within the second housing part 3 in the direction of the second axis B. Shortly before the second housing part 3 is completely closed or rather in the closed position, the cylinder-shaped centering plug 5c moves into engagement with the centering recess 4g of the spigot 4f, so that the radial position of the latter is, if need be, corrected such that the first axis A and the second axis B assume a congruent course. The radial position of the label 12e held by the locating device 4 is thereby accordingly altered. The section of the cylinder-shaped centering plug 5c penetrating the spigot 4f can be structured to be partially cone-shaped. After the second housing part 3 is brought into the closed position, the compact disk 11a and the adhesive label 12e are still interspaced in the direction of the axes A and B. By lightly pressing the second housing part 3 in said direction, the latter glides in said direction to the. first housing part 2, whereby a spring tension builds up. With the press-button 5 released, such spring tension allows the latter to glide back to the initial or home position. As a result of the displacement of the actuating device 5 in the direction of the first housing part 2, the cylinder-shaped centering plug 5c penetrates further into the spigot 4f, whereby the inner edge of the compact disk 11a comes to rest upon the spigot 4f and, during further lowering of the press-button 5, presses down the spigot 4f until the CD lies planar upon the adhesive label 12e resting on the supporting surface 2b, so that the adhesive label 12e is affixed to the CD in a concentric position relative to the latter. During this process, the two spring elements 4a close-lying against the inner circle of the adhesive label 12e likewise glide downwardly, so that the adhesive label 12e lies planar, also in the area of the inner circle, upon the supporting surface 2b, thereby ensuring that the label 12e during the contact stage lies absolutely flat with respect to the CD. The compact disk 11a extending concentrically relative to the adhesive label 12e as well as parallel to the adhesive label 12e is thus placed upon the latter, so that the adhesive label 12e is affixed in the desired, precisely defined and recursively reproduceable position. Subsequent to the glueing process, the press-button 5 is released, whereupon the latter retracts to the initial position by virtue of the aforesaid spring tension. After that, the second housing part 3 is swivelled back to the open position, so that the compact disk 11a retained in the locating device 3b can be taken out.

The FIGS. 4a, 4b and 4c illustrate different positions of the two housing parts 2 and 3. FIG. 4a shows the apparatus 1 in the closed position, FIG. 4b shows the half-open apparatus 1 and FIG. 4c shows the apparatus 1 in the fully open position. In this position, the compact disk 11a is expediently removed, the new compact disk 11a inserted in the second housing part 3, and the new label 12e placed in the first housing part 2. The closed position shown in FIG. 4a can be conveyed into the locked position in that the locking means 7 are actuated such that, as shown in FIG. 3, the locking component 7d moves into engagement with the locking nose 7b. Subsequent to ending labeling work, the apparatus 1 is locked in such a manner that the apparatus can be compactly stored and the interior space is kept dustfree. In order to store or stack the apparatus, the first housing part 2 should be firmly locked with the second housing part 3. Without interlocking, the cylinder-shaped centering plug 5c would permanently press the second housing part 3 upwards because of the tension force of the spiral spring 4b and thereby keep the second housing part 3 in a slightly open position, such that the apparatus 1 would not be compactly storeable and the interior space thereof will not remain dustfree. To unlock the apparatus 1, the locking means 7 must be again released. In the embodiment depicted in. FIG. 3, such disengagement is effected by pulling out the locking component 7d by means of a finger or finger-nail, thereby releasing the connection to the locking nose 7b.

Figure 5:
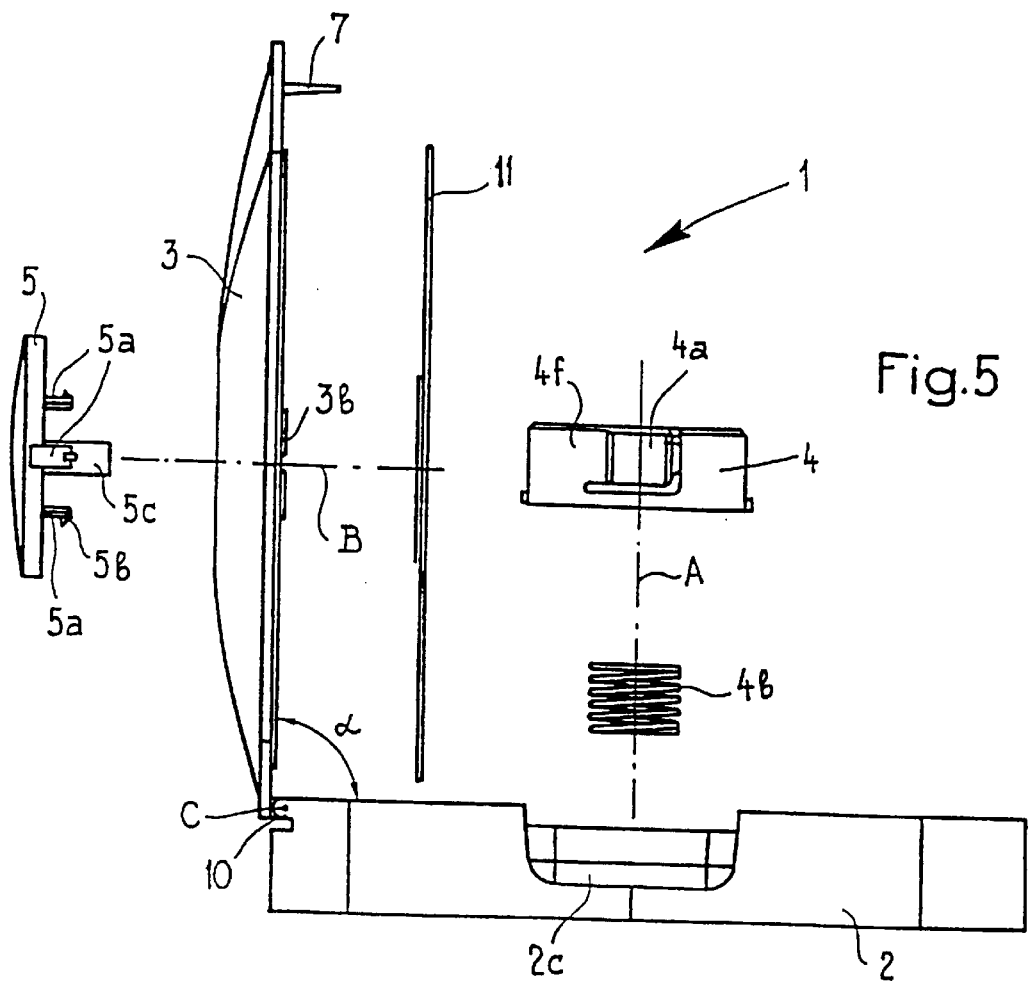
FIG. 5 shows a lateral exploded view of the apparatus in the half-open position.

In FIG. 5 there is shown a lateral exploded view of the apparatus 1, whereby the locating device 4 and the spiral spring 4b are arranged in the direction of the first axis A. The first housing part 2 and the second housing part 3 are swivelled about the common swivel axis C, the swivel angle α in this case being 90°.

Figures 6A, 6B:
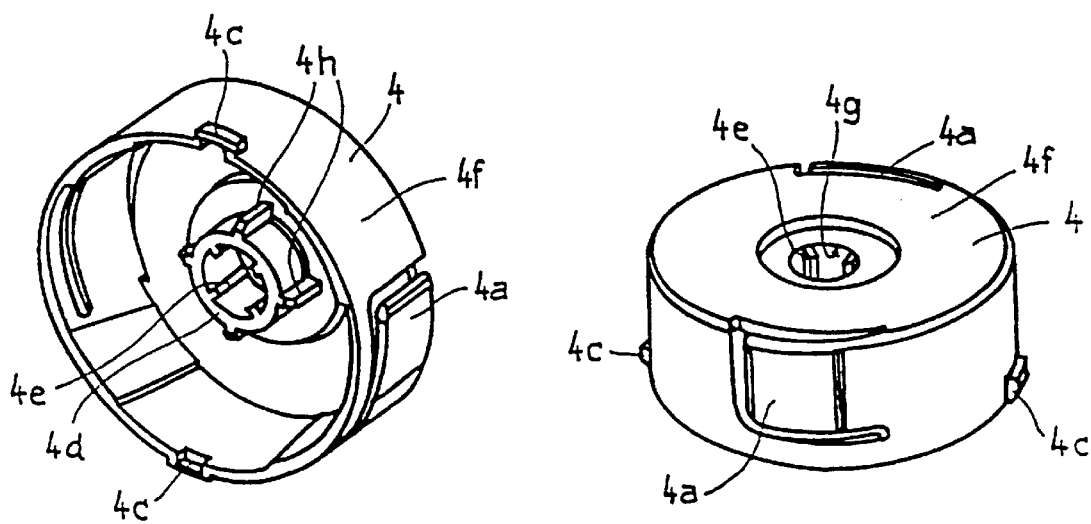
FIGS. 6a, 6b show perspective views of a locating device structured as a spigot.

The FIGS. 6a and 6b each show a perspective view of the locating device 4 structured as the spigot 4f. On the bottom side of the locating device 4 according to FIG. 6a there is provided a centering component 4d including four spring-tension ribs 4h which extend in the axial direction of the first axis A, such ribs 4h being provided for the spiral spring 4b. Furthermore, in the center of the spigot 4f there is provided the centering recess 4g including four guide elements 4e extending in the axial direction of the first axis A and uniformly distributed across the recess circumference, these guide elements 4e being provided to interact with the cylinder-shaped centering plug 5c.

Figure 7A:
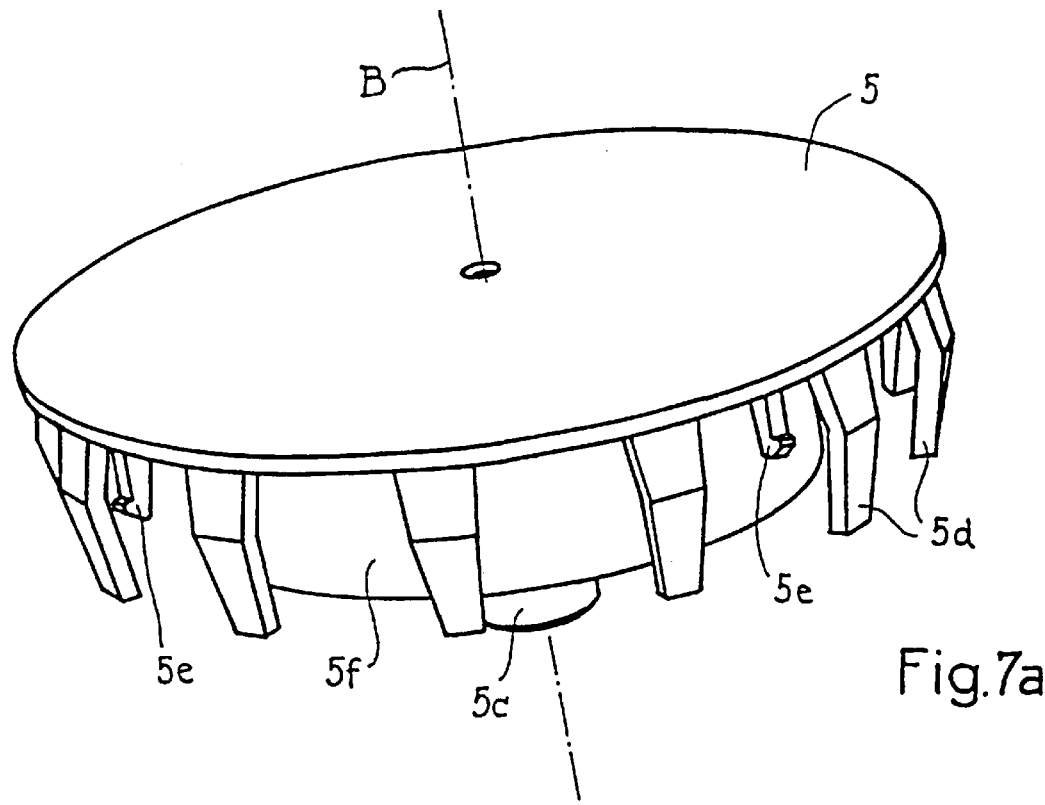
FIGS. 7a, 7b show perspective views of a further embodiment of an actuating device.
Figure 7B:
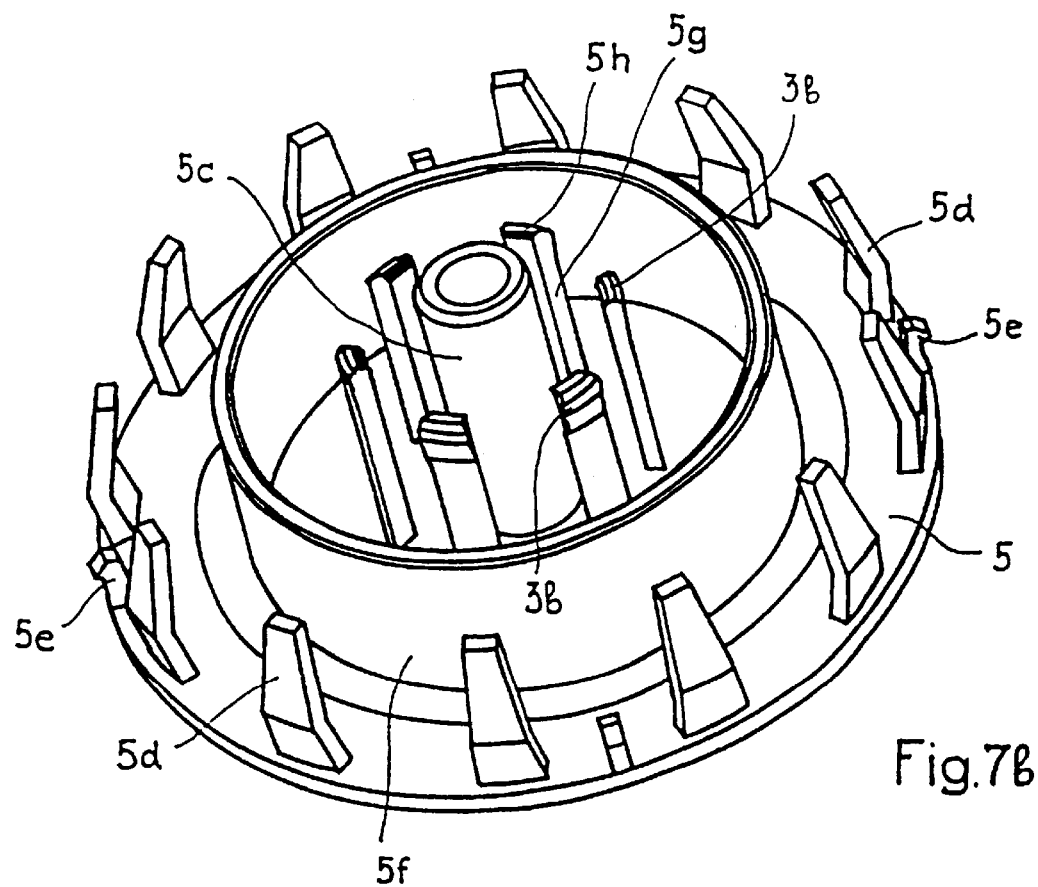
Figure 8A:
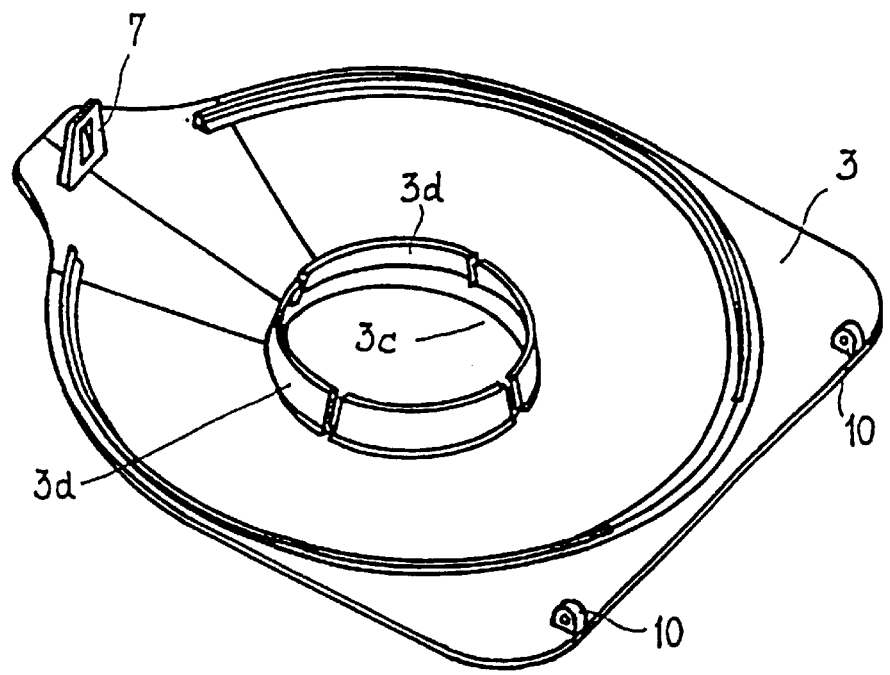
FIG. 8a shows a perspective view of a further embodiment of a second housing part.

FIG. 8a shows a perspective view of a further embodiment of the second housing part 3 including the hinges 10 and the locking means 7. This second housing part 3 is rigidly structured and has in the center a circular recess 3c with four flange segments 3d which extend in the circumferential direction and which are tapered toward the respective free ends thereof. According to the showing of FIG. 8a, the second housing part 3 comprises an adaptedly structured actuating press-button 5 shown in detail in the FIGS. 7a and 7b. This press-button 5 comprises a plurality of spring legs or struts 5d evenly or uniformly distributed in the circumferential direction, which spring legs or struts 5d are close-lying at the flange segments 3d when the press-button 5 is inserted in the second housing part or cover 3. When the press-button 5 is pressed in in the axial direction of the second axis B, the resiliently structured spring legs or struts 5d deform under strain along the rigidly structured flange segments 3d, this producing a force acting in the opposite direction relative to the actuating direction. Subsequent to releasing the push-button 5, the spring legs or struts 5d are relieved and the push-button returns to the initial position thereof. The push-button 5 is connected with the second housing part 3 by means of four holder elements 5e which comprise respective retainer noses 5h evenly distributed at the circumference, whereby these holder elements 5e are arranged in the spacings of the flange segments 3d. The push-button 5 comprises a locating device for the compact disk 11a, in which six spring flexible tongues 5g including respective retainer noses 5h are provided, whereby the push-button 5 comprises in addition a supporting element 5f which, on the one hand, serves to brace the push-button 5 and, on the other hand, forms a supporting surface for the compact disk 11a, so that the CD in connection with the retainer noses 5h is reliably and removably retained. Furthermore, this push-button 5 is provided with the cylinder-shaped centering plug 5c which, as hereinbefore described, serves to mutually center the adhesive label 12e with the compact disk 11a. As an alternative to the spring legs or struts 5d, there can be also provided a spiral spring located in the push-button 5 and cooperating with the second housing part 3, in order to produce the restoring force. The housing parts 2 and 3 as well as the push-button 5 are preferably made of a plastics material, for instance, a thermoplast.

Figure 8B:
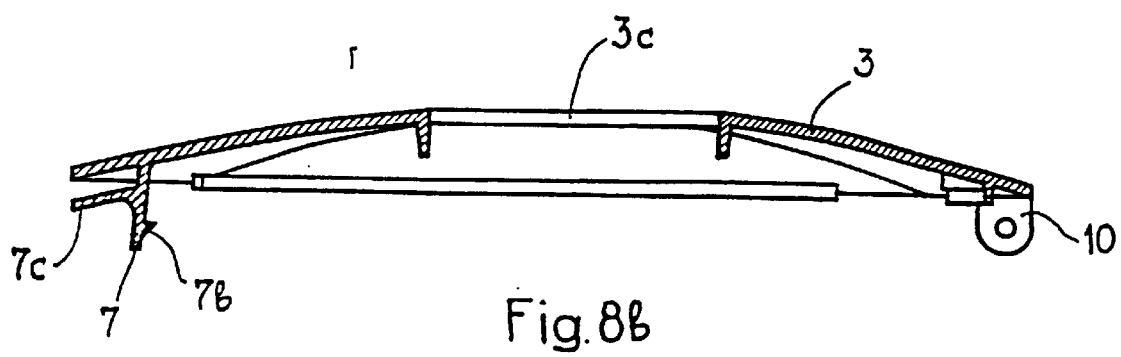
FIG. 8b shows a longitudinal section through yet a further embodiment of the second housing part.

FIG. 8b shows a longitudinal section through a second housing part 3 which, with the exception of the locking means 7, is identical with the second housing part 3 depicted in FIG. 8a. The locking means 7 depicted in FIG. 8b comprise the locking nose 7b which can engage with an opening located in the first housing part 2 when the housing part 3 is to be locked with the housing part 2. The locking means 7 comprise an operating lever 7c in order to engage the locking nose 7b with the not particularly illustrated recess and thereby to lock the second housing part 3 with the first housing 2 or to unlock the second housing part 3 from the first housing part 2.

In the first housing part 2 or in the second housing part 3 there can be arranged a counting device, preferably without a battery, and which is operated with a solar cell or by piezoelectronic means, generates an impulse upon closing the housing parts 2 and 3, adds such impulse and visually indicates the latter in a display, for instance, in a numeric representation, so that at any time a reading can be taken to determine how many compact disks have been provided with a label. This electronic device comprises an on-off switch as well as a reset key. Furthermore, there could be provided a limit allowance as well a signal transmitter triggering a visual or audible signal when such limit is reached, thereby indicating that the limited number of compact disks have been each provided with a label.

The apparatus 1 according to the invention to place a self-adhesive label 12e requires an adaptedly structured compound label 12 which, on the one hand, is readily inscribable or rather printable either manually or with commercially available printer means such as a laser printer or an ink-jet printer and which, on the other hand, can be readily placed or inserted in the apparatus 1 according to the invention and, in particular, excludes any contact of the sticky surface of the adhesive label with the fingers of the operator.

Figure 9A:
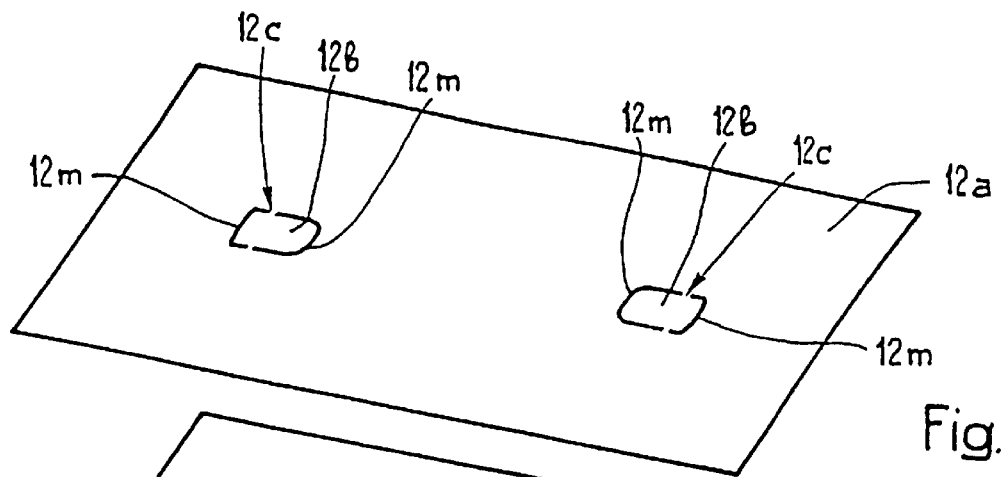
FIGS. 9a, 9b, 9c show perspective and plan views of a compound label structured as an inscribable sheet.
Figure 9B:
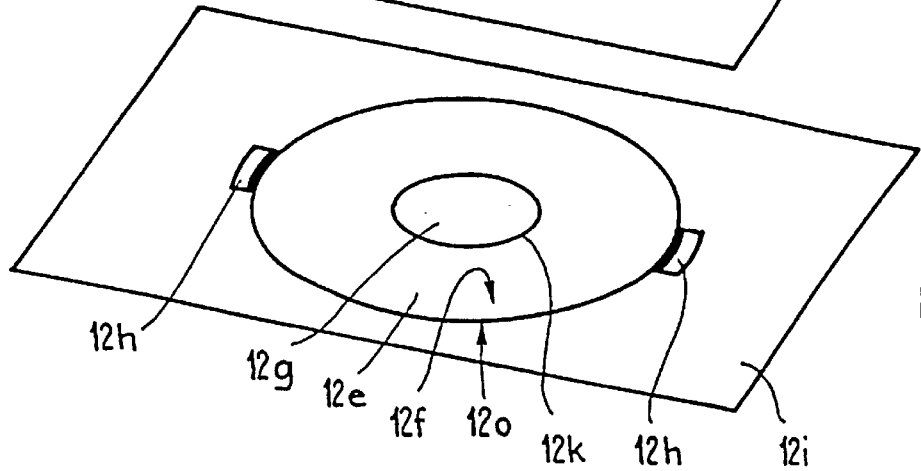
Figure 9C:
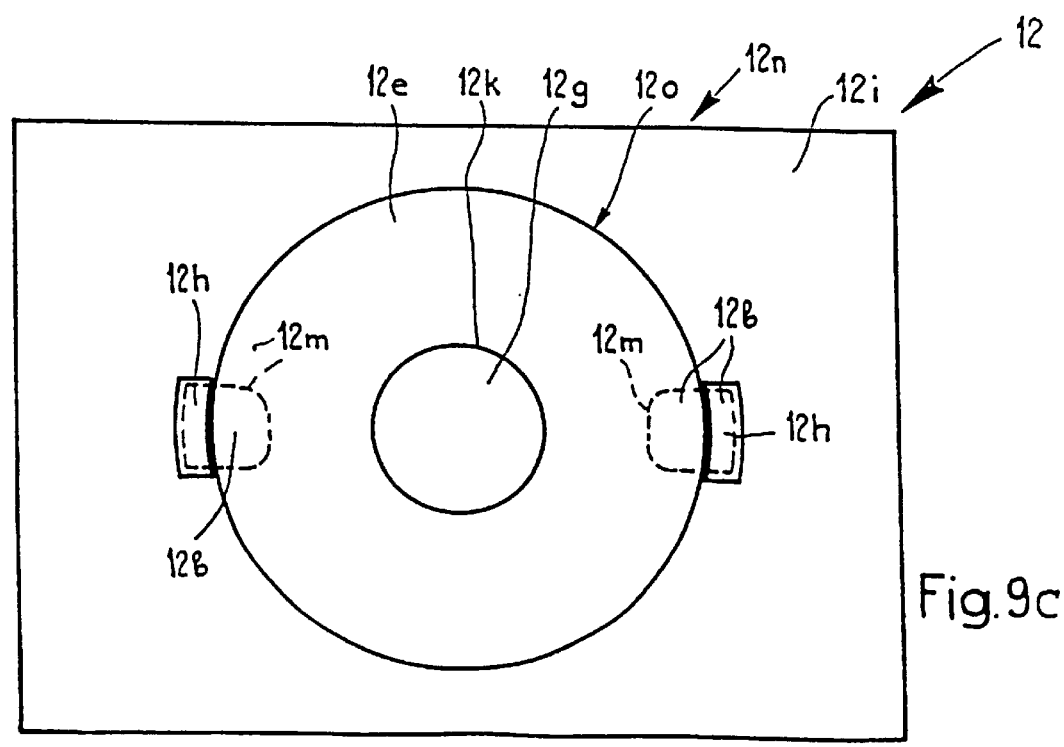

FIG. 9c shows a plan view of a compound label 12 adapted to the apparatus 1 according to the invention and structured as an inscribable sheet 12n. A label 12e for a compact disk is punched into the compound label 12. Such compound label 12 comprises a carrier material 12a (FIG. 9a) structured as a carrier foil, an inscribable label material 12i shown in FIG. 9b and a not particularly illustrated adhesive which is uniformly, two-dimensionally distributed between the carrier foil 12a and the label material 12i. This label material 12i comprises a free-punched label 12e, a free-punched inner surface 12g with inner circle 12k, as well as two oppositely arranged free-punched grip tabs 12h which are adjacent relative to the label 12e and jutting out in radial direction. At least the surface 12f of the label 12e is inscribable with printing means, whereby the label material 12i as well as the carrier material 12a are structured planiform and flexible, so that the surface beyond an outer circle 120 of the label 12e is inscribable, in order to make sure that the entire surface 12f of the label 12e is inscribable and does not have any uninscribable margins. The flexible structure renders possible a deflection of the compound label 12, as is required, for instance, in a laser printer. The carrier foil 12a is structured commensurate with the label material 12i and comprises two punched carrier-foil parts 12b, which are free-punched with the exception of two holding bridges in each case. These cuts 12m, not totally free-punched, could be also structured as predetermined or rated break lines 12m in that such break lines comprise a perforation. The cut 12m or rather the rated break line 12m thereby extends sectionwise in the circumferential direction of the label 12e and jutting out beyond the peripheral edge 120. From the plan view of the compound label 12 in FIG. 9c there can be seen the mutual arrangement of the label material 12i relative to the carrier foil 12a arranged therebelow. The cuts or rather the rated break lines 12m depicted by broken or dotted lines form a roundabout delimitation of the carrier tabs 12b, whereby the grip tabs 12h consisting of label material 12i and the carrier tabs 12b are mutually arranged such that the carrier tab 12b lies partially on the grip tab 12h and partially on the label 12e. The carrier-foil part 12b shown by a broken line connects the label 12e with the grip tab 12h, whereby the contour of the portion of the carrier-foil part 12b beneath the grip tab 12h is slightly smaller than the contour of the latter, so that the outer edge or border of the grip tab 12h sticks to the surrounding carrier foil 12a. By virtue of this structure there is ensured that, when printing the label 12e, particularly when the sheet 12n is guided about a deflection pulley in a printer, the grip tabs 12h do not work loose and stand up. An inscribed or printed label 12e is easily detached from the sheet 12n in that the grip tabs 12h are pressed upwards from below relative to the showing in FIG. 9c, whereupon the holding bridges 12c break, and the label 12e can be detached from the sheet 12n. The self-adhesive surface of the label 12e thus lies, with the exception of the carrier foil parts 12b, free and separated from the carrier foil 12a. The adhesive label 12e, held face-and-back at the two grip tabs 12h and with the sticky side up, is passed over the spigot 4f of the first housing part 2 of the apparatus 1 and placed flat upon the supporting surface 2b. The label 12e is located such that the grip tabs 12h protrude in the area of the respective recesses 2c and are readily accessible. The grip tabs 12h together with the remaining carrier-foil part 12b are thereafter detached from the label 12e by a cant-off movement and then easily peeled off, so that the label 12e, as shown in FIG. 2b, lies in the apparatus 1 with the inscribed surface 12f down and the sticky side up. The operator's fingers thus have no contact whatsoever with the sticky or adhesive side of the label 12e. Each such label 12e is thus clean and can be affixed without traces of finger marks. Furthermore, there are no more or less sticky fingers that could soil the inscribed compact disk when the latter is taken out, whereby, in particular, the laser-readable CD-side is very sensitive with respect to such soiling. The apparatus 1 according to the invention in combination with the adaptedly structured sheet 12n with the compound labels 12 make it possible to inscribe a multitude of compact disks with accurately centered and clean labels 12e.

In a particularly advantageous embodiment, the compound label 12 illustrated in FIGS. 9a, 9b and 9c has no holding bridges 12c and thus, relative to the carrier foil 12a, a totally free-punched carrier-foil part 12b. Such carrier-foil part thus comprises a continuous or traversing cut 12m. Therefore, the label 12e can be very easily detached from the carrier material 12a, in that one of the two grip tabs 12h is gripped and pulled up. The carrier-foil part 12b adhering to the grip tab 12h follows this draw-up movement and yanks off the label 12e in the course of the succeeding movement, whereby towards the end of the peel-off process the opposite carrier-foil part 12b is detached and, after that, the grip tabs 12h sticking thereon are drawn off, so that the label 12e detached from the carrier foil 12a—similar as shown in FIGS. 9d and 9e—is available to be placed in the apparatus 1 according to the invention.

Figures 9D, 9E:
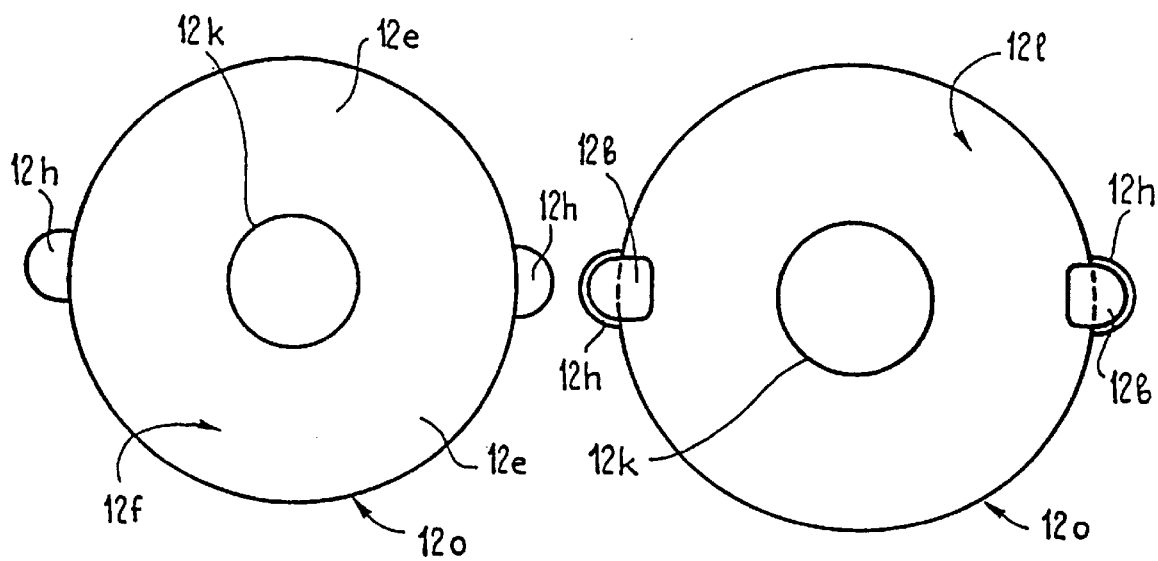
FIGS. 9d, 9e show a plan view of the two sides of an extracted adhesive label.

The FIG. 9e shows a further embodiment of a label 12e separated from the sheet 12n or rather from the compound label 12, with a top view upon the adhesive side 12l and the two carrier-foil parts 12b, which retain the grip tabs 12h. The FIG. 9d shows a plan view of the label 12e of the compound label 12 shown in FIG. 9e and having an inscribable surface 12f and grip tabs 12h. The adhesive label 12e can be fabricated from a multitude of inscribable materials, particularly paper or foil-like plastics, for example, a transparent foil or a laminated metal foil. On the label 12e, there can be applied a safety or redundant code, for example, with inscription means that become visible solely with infrared light. This allows, for example, the identification of the label 12e with a grade or quality mark of the manufacturer or renders possible a proof of originality for special users. Safety codes can be provided in different, already known manner. The label 12e is inscribable with signs. However, it can be also printed with an illustration or with graphics, or provided with a machine-readable identification such as, for example, a bar code.

The apparatus 1 according to the invention allows furthermore the arrangement of other objects between the label 12e and the disk-shaped object 11, particularly the compact disk 11a. After placing the adhesive label 12e upon the supporting surface 2b, a further object, for instance a magnetic stripe, could be placed on the adhesive side 12l and thereafter the compact disk 11a can be glued together with the label 12e, so that the magnetic stripe is firmly glued between the label and the CD. This magnetic stripe is preferably circular and likewise centrically arranged with respect to the rotational axis of the compact disk. On such a magnetic stripe, there can be stored further accessory or additional information or then, for example, a safety code.

Figure 10A:
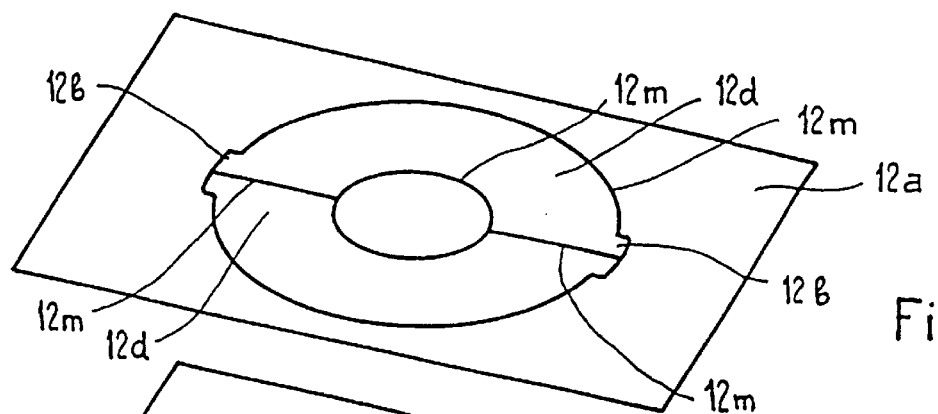
FIGS. 10a, 10b and 10c show perspective and plan views of a further embodiment of a compound label structured as an inscribable sheet.
Figure 10B:
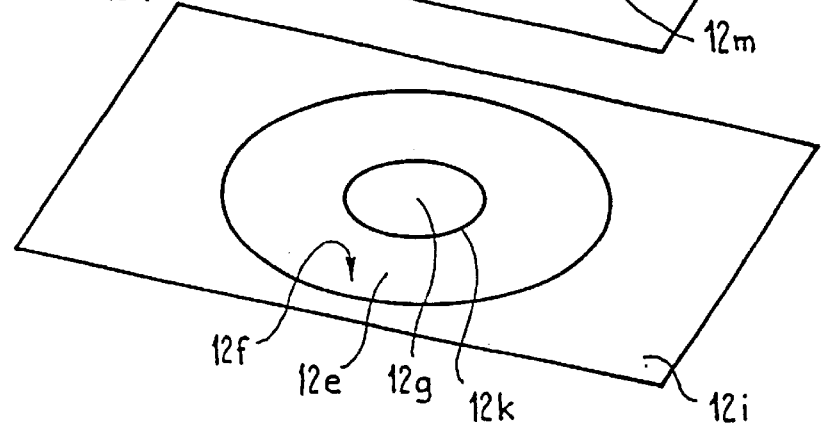
Figure 10C:
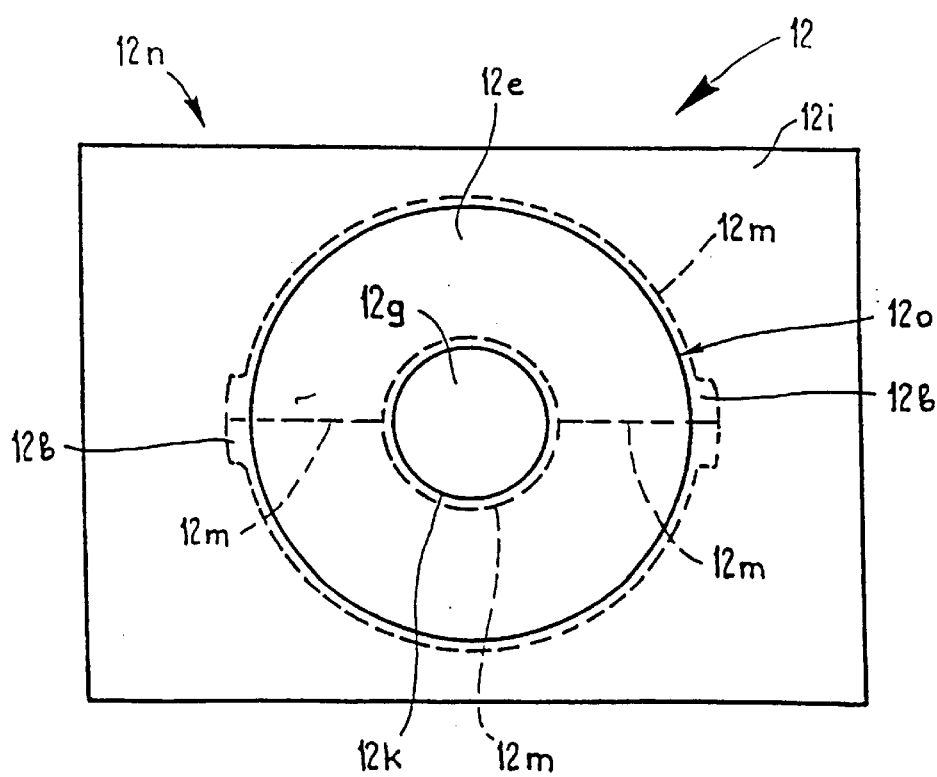

The FIGS. 10a, 10b and 10c depict a further embodiment of a compound label 12 structured as an inscribable sheet 12n. FIG. 10a shows the carrier material 12a structured as a carrier foil, such carrier material comprising a punching realized as a cut 12m or a rated break line 12m, so that two carrier-foil parts 12d with respective protruding grip tabs 12b are punched out. FIG. 10b shows the label material 12i from which a label 12e is punched out. FIG. 10c shows a plan view of the compound label 12 structured as the sheet 12n and as provided for printing. The cuts 12m or rather the rated break lines 12m of the carrier foil 12d, 12a, such cuts or break lines being underneath and represented mainly by circular broken lines comprise a slightly larger radius protruding beyond the peripheral edge of the label 12e, so that the sheet 12n is held together with the label 12e, the carrier foil 12a as well as the carrier-foil parts 12d. Subsequent to the printing of the label 12e, the inner surface 12g is pressed out, whereby the inner circle of the carrier-foil parts 12d as well as the inner circle 12k of the label 12e comprise, for better detaching, a cut 12m or rather a pre-determined break line 12m structured as a microperforation. The inner circle of the carrier-foil parts 12d as well as the inner circle 12k of the label 12e can be arranged and structured to be congruent or, as shown in FIG. 10c, can have different radii. The label 12e can be detached from the sheet 12n together with the carrier-foil parts 12d and then drawn over the locating device 4 of the apparatus 1 and placed—extending flat—upon the supporting surface 2b. Thereafter, the protruding carrier-foil part 12b of one of the carrier-foil parts 12d is seized and drawn off and, thereafter, the protruding carrier-foil part 12b of the other carrier-foil part 12d is seized and drawn off, so that the sticky side is bare and the two housing parts 2 and 3 can be brought into the closed position thereof. The sheet 12n can be provided in a standard size, for example, in format A4 or A5.

Figures 11A, 11B:
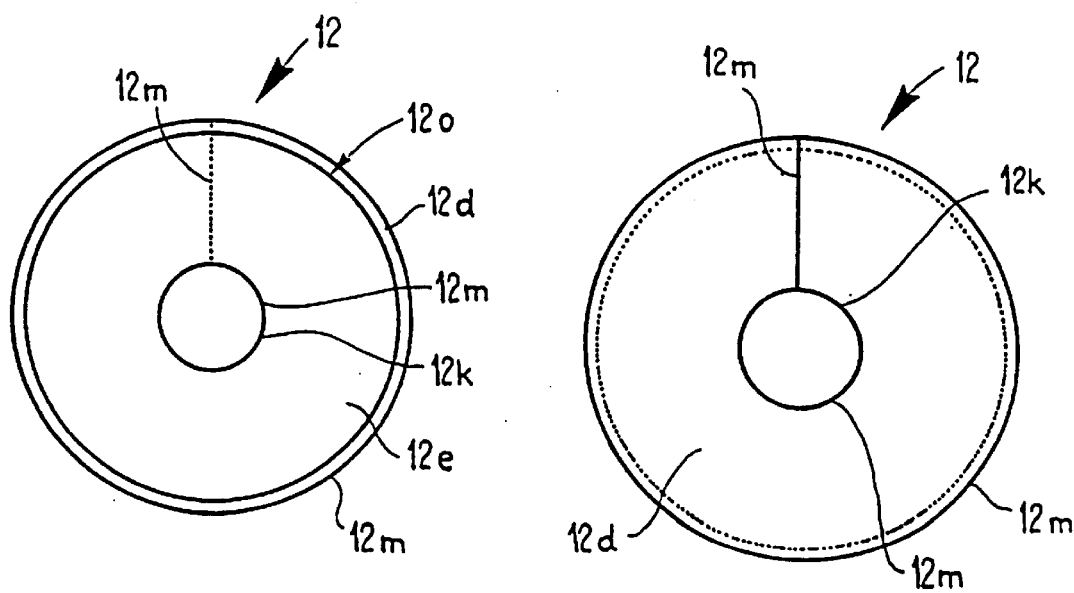
FIGS. 11a, 11b show a further embodiment of a compound label.

FIG. 11a shows a plan view of the adhesive label 12e of a further embodiment of a compound label 12. The carrier material structured as the carrier-foil part 12d has a slightly larger radius than the label 12e and therefore protrudes in the radial direction relative to the label 12e. The respective cut or trim line 12m extends concentrically relative to the label 12e. The carrier-foil 12d comprises a cut 12m or rather a rated break line 12m extending in the radial direction. In FIG. 11a, this cut or break line is underneath the label and accordingly depicted by a broken line.

FIG. 11b shows a plan view of the carrier foil 12d of the adhesive label 12e depicted in FIG. 11a. This compound label 12 in the position depicted in FIG. 11b is drawn over the locating device 4 of the apparatus 1 and placed upon the supporting surface 2b. After that, the carrier-foil part 12d protruding in the radial direction is lifted in the area of the radially extending cut or break line 12m, and then totally detached from the label 12e by means of a circular wave of the hand, so that the sticky or adhesive side is now bare. In a preferred embodiment, the depicted compound label 12 has no longer an inner surface 12g, because this center portion is already entirely punched out in the course of fabrication. The compound label 12 according to FIGS. 11a and 11b is particularly suitable to be manually inscribed, in order to provide in simple manner an inscription for a compact disk, for instance, comparable to a label for a computer diskette. The compound label 12 shown in FIGS. 11a and 11b could also have an inner surface 12g. which, for example, is connected by a perforation with the carrier foil part 12d or is held at the latter by means of a part of the label 12e.

In a further embodiment, the compound label 12 (FIGS. 9a, 9b and 9c) could be structured with carrier material 12a without cuts 12m or rated break lines 12m. The grip tabs 12h of the label material 12i are connected with the label 12e by means of a particularly perforated break line. For the placement of the label 12e into the apparatus 1, the label with the grip tabs 12h mounted thereat is detached from the carrier material 12a and placed in the apparatus 1, the grip tabs 12h thereafter being separated or detached along the respective perforated rated break lines 12m.

The embodiments of compound labels 12 shown in FIGS. 9 and 10 comprise at least one grip tab, but preferably two grip tabs 12b, 12h, which are arranged in a position radially opposite one another relative to the adhesive label 12e. The embodiment according to FIGS. 11a and 11b could likewise comprise at least one grip tab 12h firmly connected with the carrier material 12d and protruding in the radial direction.

What is claimed is:

1. An apparatus for the placement of a self-adhesive label onto a disk-shaped object, comprising:

a first housing part provided with a locating device for said label;

a second housing part provided with a locating device for said disk-shaped object;

said first housing part and said second housing part being movably connected with each other and being thereby conveyable from an open position into a closed position;

said two housing parts in said closed position serving to place said locating devices in a position arranged to face one another;

in said closed position at least one of said two locating devices being movably arranged in the respective housing part thereof to travel in the direction toward the opposite locating device in order to bring said disk-shaped object into contact with said label;

said locating device for said label comprises a cylinder-shaped spigot to hold said label in a concentrical position relative to a first axis; and said locating device for said disk-shaped object comprises a snap-on retainer in order to hold said disk-shaped object in a concentrical and perpendicular position relative to a second axis.

2. The apparatus according to claim 1, wherein:

said cylinder-shaped spigot is movably mounted to move in the linear direction of said first axis as well as in a direction perpendicular to said first axis; and said cylinder-shaped spigot is mounted prestressed in the direction of said second housing part.

3. The apparatus according to claim 1, wherein:

said cylinder-shaped spigot comprises a centering recess extending concentrically to said first axis;

said second housing part includes an actuating device with a cylinder-shaped centering plug concentrically extending to said second axis, and said centering plug and said centering recess are structured mutually adapted and intermeshing in such a manner that said first axis and said second axis congruently extend in said closed position.

4. The apparatus according to claim 3, wherein said actuating device of said second housing part comprises said locating device to retain said disk-shaped object.

5. The apparatus according to claim 1, wherein said spigot comprises at least two spring elements arranged at the circumference thereof, such spring elements serving to retain said label as well as to pick up dimensional tolerances.

6. An apparatus for the placement of a self-adhesive label onto a disk-shaped object, comprising:

a first housing part provided with a locating device for said label;

a second housing part provided with a locating device for said disk-shaped object;

said first housing part and said second housing part being movably connected with each other and being thereby conveyable from an open position into a closed position;

said two housing parts in said closed position serving to place said locating devices in a position arranged to face one another;

in said closed position at least one of said two locating devices being movably arranged in the respective housing part thereof to travel in the direction toward the opposite locating device in order to bring said disk-shaped object into contact with said label;

said locating device for said label comprises a cylinder-shaped spigot to hold said label in a concentrical position relative to a first axis;

said locating device for said disk-shaped object comprises a snap-on retainer in order to hold said compact disk in a concentrical and perpendicular position relative to a second axis; and said apparatus being for the concentric application of said label onto a compact disk.

7. The apparatus according to claim 6, wherein:

said cylinder-shaped spigot is movably mounted to move in the linear direction of said first axis as well as in a direction perpendicular to said first axis; and said cylinder-shaped spigot is mounted prestressed in the direction of said second housing part.

8. The apparatus according to claim 6, wherein:

said cylinder-shaped spigot comprises a centering recess extending concentrically to said first axis;

said second housing part includes an actuating device with a cylinder-shaped centering plug concentrically extending to said second axis, and said centering plug and said centering recess are structured mutually adapted and intermeshing in such a manner that said first axis and said second axis congruently extend in said closed position.

9. The apparatus according to claim 8, wherein said actuating device of said second housing part comprises said locating device to retain said compact disk.

10. The apparatus according to claim 6, wherein said spigot comprises at least two spring elements arranged at the circumference thereof, such spring elements serving to retain said label as well as to pick up dimensional tolerances.

11. An apparatus for placement of a self-adhesive label onto a disk-shaped object by moving the disk-shaped object toward the self-adhesive label, the apparatus comprising:

a first housing part comprising a locating device for locating the self-adhesive label;

a second housing part comprising a movable locating device for locating the disk-shaped object;

the first and second housing parts being movably connected so as to define an open position and a closed position;

the self-adhesive label and the disk-shaped object being insertable into a respective first and second housing part in the open position; and the disk-shaped object being movable toward the self-adhesive label in the closed position, wherein movement of the locating device of the second housing part moves the disk-shaped object towards the self-adhesive label, whereby the self-adhesive label becomes attached to the disk-shaped object.

12. An apparatus for placement of a self-adhesive label onto a disk-shaped object by moving the disk-shaped object toward the self-adhesive label, the apparatus comprising:

a first housing part comprising a movable locating device for locating the self-adhesive label;

a second housing part comprising a movable locating device for locating the disk-shaped object;

the first and second housing parts being movably connected so as to define an open position and a closed position;

the self-adhesive label and the disk-shaped object being insertable into a respective first and second housing part in the open position; and the disk-shaped object being movable toward the self-adhesive label in the closed position, wherein movement of the locating device of the second housing part moves the disk-shaped object towards the self-adhesive label and engages the movable locating device of the first housing part, whereby the self-adhesive label becomes attached to the disk-shaped object.

13. An apparatus for placement of a self-adhesive label onto a disk-shaped object, the apparatus comprising:

a first housing part comprising a locating device for locating the self-adhesive label;

a second housing part comprising a locating device for locating the disk-shaped object;

at least one of:

the first housing part includes a recessed space which receives the self-adhesive label; and the second housing part includes a recessed space which receives the disk-shaped object;

the first and second housing parts being movably connected so as to define an open position and a closed position;

the self-adhesive label and the disk-shaped object being insertable into a respective first and second housing part in the open position, wherein, in the closed position, the disk-shaped object is movable towards the self-adhesive label, whereby the self-adhesive label becomes attached to the disk-shaped object in the closed position.

14. The apparatus of claim 13, wherein the first housing part includes a recessed space which receives the self-adhesive label and wherein the second housing part includes a recessed space which receives the disk-shaped object.

15. The apparatus of claim 13, wherein movement of the locating device of the second housing part moves the disk-shaped object towards the self-adhesive label.

16. The apparatus of claim 13, wherein the locating device of the second housing part comprises a cylinder-shaped spigot which holds the self-adhesive label.

17. The apparatus of claim 13, wherein the locating device of the first housing part comprises a snap-on retainer which holds the disk-shaped object.

18. The apparatus of claim 13, wherein the locating device of the second housing part comprises a cylinder-shaped spigot which holds the self-adhesive label and wherein the locating device of the first housing part comprises a snap-on retainer which holds the disk-shaped object, and wherein each of the locating devices are arranged concentrically relative to one another.

19. The apparatus of claim 13, wherein the locating device of the second housing part is movably mounted.

20. The apparatus of claim 13, wherein the locating device of the first housing part is movably mounted.

21. The apparatus of claim 13, wherein the locating device of the first housing part is movably mounted in the closed position.

22. The apparatus of claim 13, wherein the locating device of the first housing part is biased away from the second housing part in the closed position.

23. The apparatus of claim 13, wherein the locating device of the first housing part comprises a mechanism which removably retains the disk-shaped object.

24. The apparatus of claim 13, wherein the locating device of the second housing part is movably mounted.

25. The apparatus of claim 13, wherein the locating device of the second housing part comprises spring elements which engage the self-adhesive label.

26. The apparatus of claim 13, wherein the locating device of the second housing part is biased towards the first housing part.

27. The apparatus of claim 13, wherein the self-adhesive label comprises removable grip tabs which can be removed before the self-adhesive label is attached to the disk-shaped object.

28. The apparatus of claim 13, wherein the second housing part comprises recesses which are adapted to receive removable grip tabs of the self-adhesive label.

29. The apparatus of claim 13, further comprising a locking mechanism which releasably locks the first and second housing parts in the closed position.

30. A method of using the apparatus of claim 13 to install a self-adhesive label on a disk-shaped object, the method comprising:

placing the self-adhesive label in the second housing part in the open position;

mounting the disk-shaped object in the first housing part in the open position; and installing the self-adhesive label on the disk-shaped object in the closed position.

31. The method of claim 30, further comprising, before the mounting, removing the self-adhesive label from a carrier material.

32. An apparatus for placement of a self-adhesive label onto a disk-shaped object, the apparatus comprising:

a first housing part comprising a locating device for locating the self-adhesive label;

the first housing part having a recessed space which receives the self-adhesive label;

a second housing part comprising a locating device for locating the disk-shaped object;

the second housing part having a recessed space which receives the disk-shaped object;

the first and second housing parts being movably connected so as to define an open position and a closed position;

the self-adhesive label and the disk-shaped object being insertable into a respective first and second housing part in the open position, wherein movement of the locating device of the second housing part moves the disk-shaped object towards the self-adhesive label, whereby the self-adhesive label becomes attached to the disk-shaped object.

33. The apparatus of claim 32, wherein the locating device of the first housing part is movably mounted and biased away from the second housing part in the closed position.

34. The apparatus of claim 32, wherein the locating device of the second housing part is movably mounted and biased towards the first housing part in the closed position.

35. A method of using the apparatus of claim 32 to install a self-adhesive label on a disk-shaped object, the method comprising:

in the open position:
arranging the self-adhesive label about the locating device of the second housing part;
removably securing the disk-shaped object to the locating device of the first housing part;

locking the first and second housing parts together in the closed position; and moving the disk-shaped object towards the self-adhesive label.

36. The method of claim 35, further comprising, before the arranging, removing the self-adhesive label from a carrier material.

* * * * *

UNITED STATES PATENT AND TRADEMARK OFFICE
CERTIFICATE OF CORRECTION

PATENT NO.    : 6,508,914 B1
DATED         : January 21, 2003
INVENTOR(S)   : E. Schwaller et al.

It is certified that error appears in the above-identified patent and that said Letters Patent is hereby corrected as shown below:

<u>Column 1,</u>
Line 29, "consecutive renders" should be -- consecutive sequence. On the one hand this renders --.

Signed and Sealed this

Twenty-second Day of April, 2003

JAMES E. ROGAN
*Director of the United States Patent and Trademark Office*